Feb. 12, 1957 V. L. REDDLE 2,781,148
QUICK ACTING CLOSURE
Filed Nov. 16, 1954

INVENTOR
Victor Leon Reddle.
BY
W. J. Eccleston
ATTORNEY

United States Patent Office 2,781,148
Patented Feb. 12, 1957

2,781,148
QUICK ACTING CLOSURE

Victor Leon Reddle, Falls Church, Va., assignor to the United States of America as represented by the Secretary of the Army Application November 16, 1954, Serial No. 469,323

1 Claim. (Cl. 220—40)

My invention relates to quick acting closures for containers and more particularly to closures for metallic containers such as cans or drums. Many types of quick acting closures are known such as bayonet slots, interrupted screw threads, and cam fastened closures. Whenever it is necessary to use such closures with a sealing gasket they have the disadvantage that they cannot be tightened beyond the limits of the bayonet slots, interrupted threads or the throw of the cam. Such closures make no provision for overcoming "compression set" in the gasket after the seal has been maintained for relatively long periods. This "setting" is particularly prevalent in the synthetic rubbers or elastomers which are widely used at present and which are even necessary where the drum contains petroleum products which actively attack natural rubber.

For instance, current Federal specifications for gasket materials used on 55 gallon drums permit a 40% compression set in a gasket after being compressed for 22 hours at 158° F. The closures for such drums must be able to withstand hydrostatic pressures up to 30 p. s. i. without leakage. The closure should be capable of withstanding up to 50 cycles of temperature fluctuation from —65° F. to 160° F. without leaking or "breathing." Additionally, the gasket material must survive temperature and solvent tests before it is universally acceptable. The synthetic rubber able to pass such temperature and solvent tests inevitably have the undesirable compression set characteristics mentioned above.

Thus, to maintain an acceptable seal in spite of the compression set qualities of the gaskets, it has been suggested that the closures be modified to incorporate resilient means exerting a continuous resilient pressure on the gaskets.

Such resilient means usually comprises metal springs of various types which, while satisfactory in the main, are relatively expensive and if broken or lost are difficult or even impossible to replace in the field.

With the foregoing in view it is an object of my invention to provide an improved quick acting closure which will provide for compensaton for compression set in a resilient gasket without the use of springs or the like.

A further object is to provide such a closure which comprises part having a quick acting connection with the container and a closure-providing part which is adjustable relative to said first part and adapted to be a pre-set so as to exert a selected amount of pressure on the gasket whereby to compensate for any compression set in the gasket.

A further object is to provide such a closure wherein at least the quick acting part includes outwardly extending, tool-engaging means for actuating the same.

Other objects and advantages reside in the particular structure of the invention, the structure of the several elements thereof, combinations and sub-combinations of such elements and/or in the particular method or mode of operation—all of which will be readily apparent to those skilled in the art upon reference to the attached drawing in connection with the following specification wherein the invention is shown, described and claimed.

Figure 1:
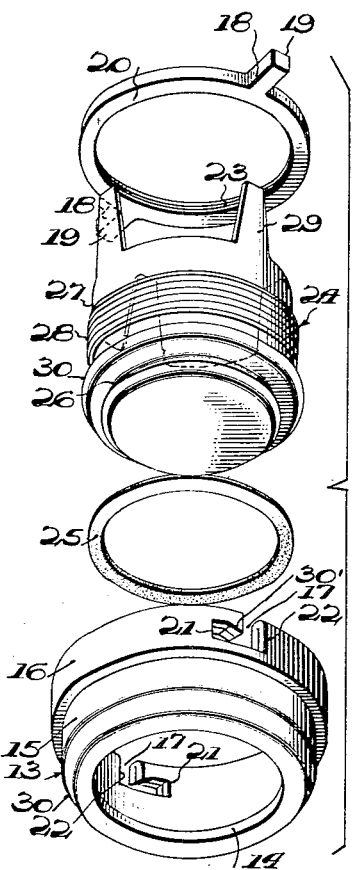
Fig. 1 is an exploded perspective view of a preferred form of the invention.
Figure 2:
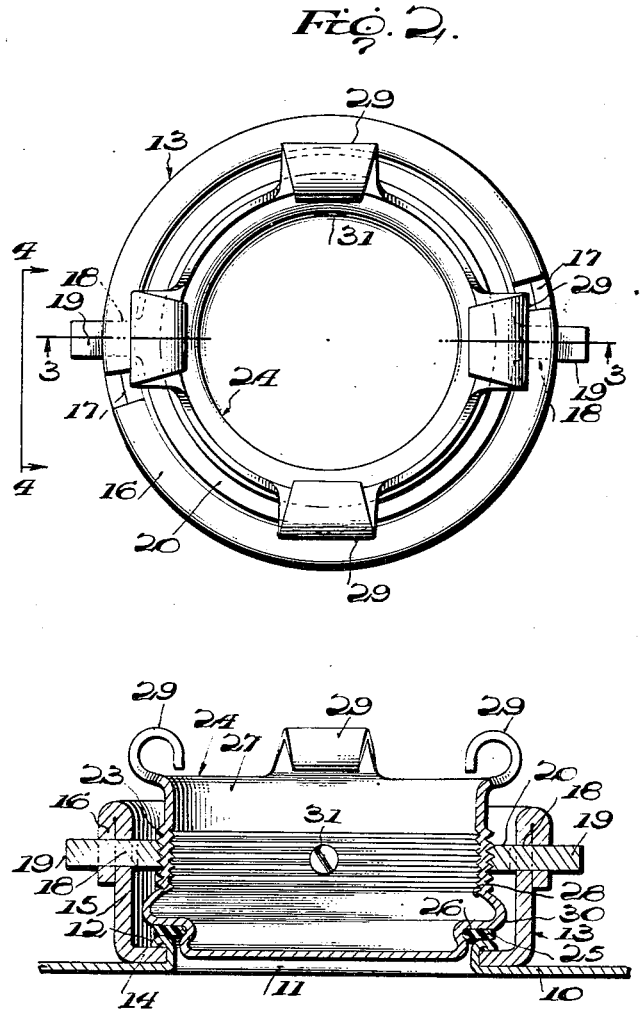
Fig. 2 is a top plan view of the closure showing the same applied to the container.
Figure 3:
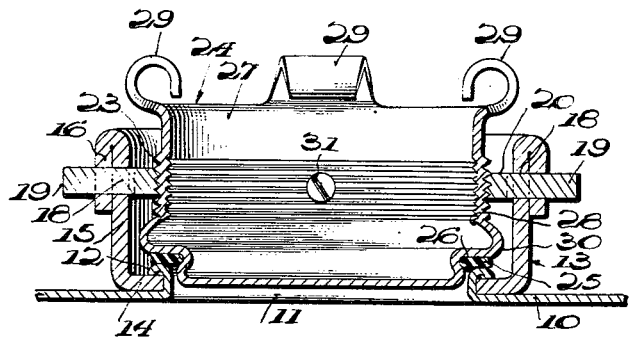
Fig. 3 is a transverse sectional view taken substantially on the plane of the line 3—3 of Fig. 2.

Referring specifically to the drawing wherein like reference characters designate like parts in all views, 10 designates a wall of any suitable container having an opening 11 therein which is defined by a suitable embossment 12. The embossment 12 secures a sput 13 to the wall 10 in any suitable and well known manner. In the embodiment illustrated, the sput 13 includes an annular horizontal flange 14 disposed concentrically of the opening 11 and over which the embossment 12 is crimped in a well known manner to form an annular rib which provides a gasket seat.

The sput 13 includes also an annular vertical flange or neck 15 which is integral with the horizontal flange 14 and is likewise concentric to the opening 11 and embossment 12 outwardly of the same. The free end of the neck of flange 15 is doubled rearwardly upon itself as at 16 to provide a reinforced free end portion of double thicknes at the outer end of the neck.

Figure 4:
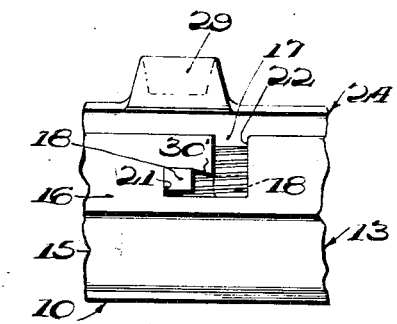
Fig. 4 is a fragmentary elevational view looking in the direction and covering the area indicated by the line 4—4 of Fig. 2.

The doubled end portion 16 has two or more bayonet slots 17 cut therethrough. The slots 17 receive and seat complementary bayonet slot lugs 18. In the illustrated form of the invention, the lugs 18 have free ends 19 which project radially outwardly of the neck 15 through the slots 17. Lugs 18 are fixed to a closure carrier 20 and the free ends 19 provide means for actuating the carrier 20 into and out of disconnected and seated positions in said neck. Thus, with the lugs at the closed ends 21 of the horizontal dwell portions of the slots 17, the carrier 20 is in the seated position. Obviously, when the lugs 18 are at the opposite ends of the dwell portions of the slots so as to be aligned with the axially directed legs 22 of the slots, as indicated in broken lines in Fig. 4, the carrier 20 is in the disconnected position and can be removed from the neck merely by moving it axially outwardly thereof by the free ends 19 of the lugs.

Although the actuating means for the carrier 20 preferably comprises the radially projecting free ends 19 of the lugs 18, it is obvious that this portion of the invention is susceptible to other forms and expressions within the spirit and scope of the invention as hereinafter claimed. The same is true of the particular bayonet slot illustrated which may assume any conventional and well known shape beside the particular shape illustrated.

The carrier 20 is sized to fit within the neck 15 and in the form illustrated is formed with an internally threaded axially located hole 23 in which is threaded the externally threaded closure 24. This closure 24 may be of any suitable form such as the cup-shaped device illustrated. A sealing gasket 25 is interposed between the closure 24 and the gasket seat provided by the embossment 12. Preferably the gasket 25 is carried by and secured to the closure 24 in any suitable manner as by being seated in a groove 26 formed in the lower exterior corner of the closure. The side wall 27 of the closure has at least a portion of the exterior formed with screw threads 28 which are complementary to the threads 23 of the carrier 20 so as to provide an axially adjustable connection between the closure 24 and its carrier 20. The closure 24 should also include suitable actuating means such as the ears 29 which extend upwardly and radially outwardly of the free upper edge of the wall 27 of closure 24. As aforesaid, the closure 24 need not assume the form shown and described and is susceptible of wide variation without departing from the scope of the invention as claimed.

To assemble the device the ears 29 are not formed until after the carrier 20 has been threaded onto the closure 24 as suggested in Fig. 1. Thereafter, the ears 29 in cooperation with a rib 30 at the lower end of the wall 27 comprise means for retaining the carrier 20 on the closure 24.

In operation, and for the initial application of the device to a container, the assembled carrier 20 and closure 24 are applied to the neck 15 and the carrier is turned to the seated position with the closure 24 axially retracted so that the gasket 24 carried thereby is out of contact with the gasket seat 12. This operation requires no particular force and the lugs 18 are readily seated behind the retainer cams 30' of the horizontal arms of the bayonet slots 17. Then, the closure 24 is moved axially inwardly by its actuating means 29 until the gasket 25 is firmly seated on its seat 12. Thereafter, further adjustment of the closure 24 relative to the carrier 20 is unnecessary and the assembly is removed from and applied to the neck 15 solely by the quick acting connection of the lugs 18 and bayonet slots 17. Only when the gasket has been flattened by compression set will it be necessary to retighten the closure 24 relative to the carrier 20. In this connection, any suitable and well known means such as any number of nut locks (not shown) or a set screw 31 may be used to prevent movement of the closure 24 relative to the carrier 20 once the former has been pre-set as aforesaid.

It should be noted that the projecting actuating means 19 for the carrier can be hammered with any suitable striking tool or even a stone to actuate the carrier to and from the seated and disconnected positions. Also, it should be noted that the horizontal arms of the bayonet slots 17 have a height slightly greater than the thickness of the lugs 18 whereby the latter may be forced past the retainer cams 30' thereof against the resistance of the gasket 25.

It follows from the foregoing that the invention as disclosed provides a quick acting closure without the use of metallic springs or the like. At the same time, the device is capable of compensating for compression set in the gasket.

It is true that closure devices such as that of U. S. Patent No. 1,493,058 to Waker, dated May 6, 1924, bear a superficial resemblance to the invention. However, such devices are not quick acting closures and lack any showing or suggestion of any actuating means for the carrier which are located outwardly of the sput. Thus, although my device is applied initially like these devices, it is thereafter applied and removed solely by the quick action connection between the carrier and sput. Wacker and like devices cannot be so applied and removed.

While I have shown and described what is now thought to be a preferred embodiment of the invention, it should be understood that the same is susceptible of other forms and expressions. Consequently, I do not limit myself to the precise structures shown and described hereinabove except as hereinafter claimed.

I claim:

In a quick acting closure for an opening in a container wall, said opening being defined by a flange; the improvement comprising a closure carrier, a quick acting bayonet slot connection between said carrier and flange, an externally threaded, cup-shaped closure including a cylindrical side wall, said carrier being formed with an internally threaded hole axially thereof and threadedly receiving said closure therein for pre-setting said closure axially relative to said carrier, actuating means on said carrier, said carrier being moved by said actuating means to and from seated and disconnected positions in said neck, said closure being pre-set to a position wherein it closes said opening when said carrier is moved to said seated position, and locking means extending radially through said side wall of said closure into engagement with said carrier and locking said closure in said pre-set position.

References Cited in the file of this patent

UNITED STATES PATENTS

| | | |
|---|---|---|
| 1,156,256 | Taylor | Oct. 12, 1915 |
| 1,700,503 | Lyon et al. | Jan. 29, 1929 |
| 2,016,224 | Bukolt | Oct. 1, 1935 |
| 2,065,479 | Soper | Dec. 22, 1936 |
| 2,225,448 | Hamilton | Dec. 17, 1940 |

FOREIGN PATENTS

| | | |
|---|---|---|
| 925,444 | France | Mar. 31, 1947 |